US006588749B1

(12) United States Patent
Tastad

(10) Patent No.: US 6,588,749 B1
(45) Date of Patent: Jul. 8, 2003

(54) APPARATUS AND METHOD FOR ADAPTING A GAMING MACHINE FOR USE WITH A COIN HOPPER OR PRINTER

(75) Inventor: Gregory J. Tastad, Kenosha, WI (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 10/142,176

(22) Filed: May 9, 2002

(51) Int. Cl.[7] ................................................ A63F 13/08

(52) U.S. Cl. .............................. 273/148 R; 273/138.1; 273/143 R; 463/46

(58) Field of Search ............................. 273/274, 138.1, 273/139, 148 R, 143 R; 463/46

(56) References Cited

PUBLICATIONS

US 2002/0025850 A1 United states patent publication to Hafezi dated Feb. 28, 2002.*

* cited by examiner

*Primary Examiner*—Benjamin H. Layno
*Assistant Examiner*—V K Mendiratta

(57) ABSTRACT

A gaming machine comprises a cabinet, a barrier panel, and a detachable cover. The cabinet includes a cabinet portion containing one of a coin hopper and a ticket printer. The barrier panel covers the cabinet portion and includes an opening proximate the one of the coin hopper and the ticket printer. The opening is sized to accommodate tickets dispensed from the ticket printer. The cover includes a slot sized to accommodate coins dispensed from the coin hopper. The cover is mounted to the opening when the cabinet portion contains the coin hopper. The cover is removed from the opening when the cabinet portion contains the ticket printer.

21 Claims, 3 Drawing Sheets

APPARATUS AND METHOD FOR ADAPTING A GAMING MACHINE FOR USE WITH A COIN HOPPER OR PRINTER

FIELD OF THE INVENTION

The present invention relates generally to gaming machines and, more particularly, to an apparatus and method for adapting a gaming machine for use with a coin hopper or a ticket printer.

BACKGROUND OF THE INVENTION

Gaming machines typically include a cabinet and a locked barrier panel for covering and thereby securing internal elements within the cabinet. The internal elements may, for example, include various machine components and mediums of monetary exchange, such as bills, coupons, coins, tokens, etc. Depending upon the needs of a gaming establishment, the cabinet may contain either a coin hopper or a ticket is printer.

On the one hand, coin hoppers are popular in casino gaming establishments. If the cabinet contains a coin hopper, the barrier panel may be formed with an integral small slot for conveying coins dispensed from the coin hopper into an external coin tray. The barrier panel is disposed between the internal coin hopper and the external coin tray. The small slot allows the dispensed coins to pass through the barrier panel.

On the other hand, ticket printers are popular in lottery gaming establishments and are gaining popularity in casino gaming establishments. If the cabinet contains a printer instead of a coin hopper, the barrier panel may be formed with an integral larger slot for conveying printed tickets dispensed from the printer into the external coin tray. The printed tickets may include information related to meters, machine configuration, machine location, date and time, software version, validation code(s), bar code(s), ticket number, monetary data such as “cashed-out” credits and corresponding cash amount, etc.

Thus, as noted above, the gaming machine manufacturer has supplied a first barrier panel with a first slot size for use with hopper-based machines and a second barrier panel with a second slot size for use with printer-based machines. The size of the slot is adapted to the dispensing component (i.e., coin hopper or ticket printer) so that an unscrupulous individual cannot readily access the internal elements within the cabinet via the slot for such nefarious purposes as tampering and theft. The provision of different barrier panels, depending upon whether the machine requires a coin hopper or a ticket printer, adds cost and complexity to the machine manufacturing process and may also require different ancillary components to better secure the internal elements within the cabinet.

Furthermore, to convert a hopper-based gaming machine to a printer-based gaming machine, the barrier panel with the small slot for accommodating coins is replaced with the barrier panel with the larger slot for accommodating tickets. Similarly, to convert a printer-based gaming machine to a hopper-based gaming machine, the barrier panel with the larger slot for accommodating tickets is replaced with the barrier panel with the small slot for accommodating coins. This conversion process can be time-consuming and tedious because it requires removal and replacement of the entire barrier panel, a somewhat unwieldy component, and possibly other ancillary components.

SUMMARY OF THE INVENTION

Accordingly, the present invention provides a gaming machine comprising a cabinet, a barrier panel, and a detachable cover. The cabinet includes a cabinet portion containing one of a coin hopper and a ticket printer. The barrier panel covers the cabinet portion and includes an opening proximate the one of the coin hopper and the ticket printer. The opening is sized to accommodate tickets dispensed from the ticket printer. The cover includes a slot sized to accommodate coins dispensed from the coin hopper. The cover is mounted to the opening when the cabinet portion contains the coin hopper. The cover is removed from the opening when the cabinet portion contains the ticket printer.

BRIEF DESCRIPTION OF THE DRAWINGS

The foregoing and other advantages of the invention will become apparent upon reading the following detailed description and upon reference to the drawings.

Figure 1:
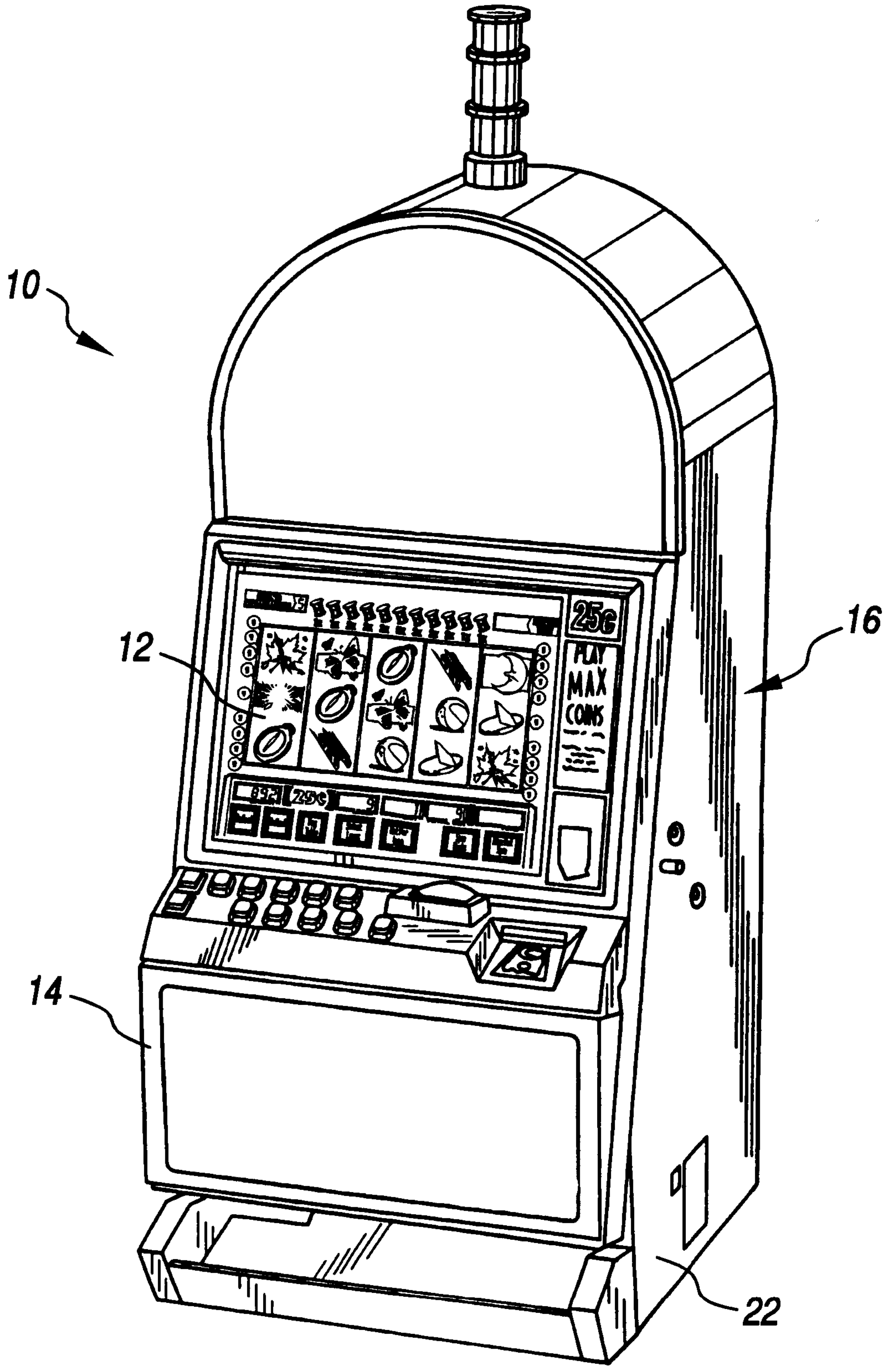
FIG. 1 is an isometric view of a gaming machine including a barrier panel arrangement for adapting a gaming machine for use with a coin hopper or a ticket printer in accordance with the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENT

Figure 2:
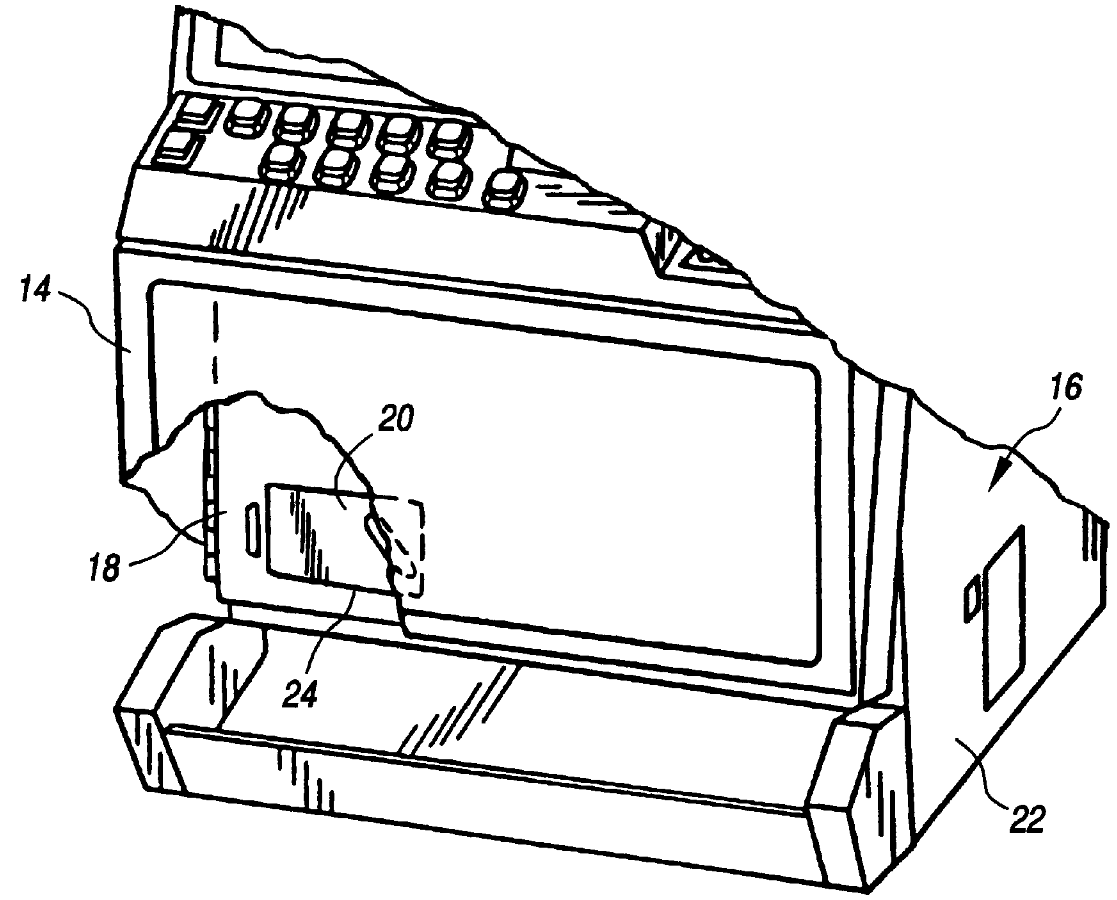
FIG. 2 is a partial isometric view of a lower portion of the gaming machine with a portion of a front door of the gaming machine broken away to reveal the barrier panel arrangement.

Referring now to the drawings, FIGS. 1 and 2 depict a gaming machine 10 including a barrier panel arrangement for adapting a gaming machine for use with a coin hopper or a ticket printer in accordance with the present invention. The gaming machine 10 is operable to play a game of chance such as mechanical or video slots, poker, blackjack, keno, or bingo. In response to a wager, a central processing unit (CPU) randomly selects a game outcome from a plurality of possible outcomes and visually represents the selected outcome on a display such as a video display 12. If the selected outcome corresponds to a winning outcome, the player is awarded a payout identified on a pay table for that winning outcome.

In addition to the video display 12, the gaming machine 10 includes a front door 14, a cabinet 16, a barrier panel 18 (see FIG. 2), and a detachable cover 20 (see FIG. 2). The front door 14 is hinged to the cabinet 16. The front door 14 is locked and closed over the cabinet 16 as shown during normal operation of the gaming machine, but may be unlocked and opened during maintenance and service of internal elements within the cabinet 16. The cabinet 16 includes a lower portion 22 containing one of a coin hopper and a ticket printer.

The barrier panel 18 is hinged to the cabinet 16 and attached to the front door 14. The barrier panel 18 is locked and closed over at least the cabinet portion 22 as shown during normal operation of the gaming machine, but may be unlocked and opened during maintenance and service of internal elements within the cabinet portion 22. The barrier panel 18 includes an opening 24 proximate the one of the coin hopper and the ticket printer.

Figure 3:
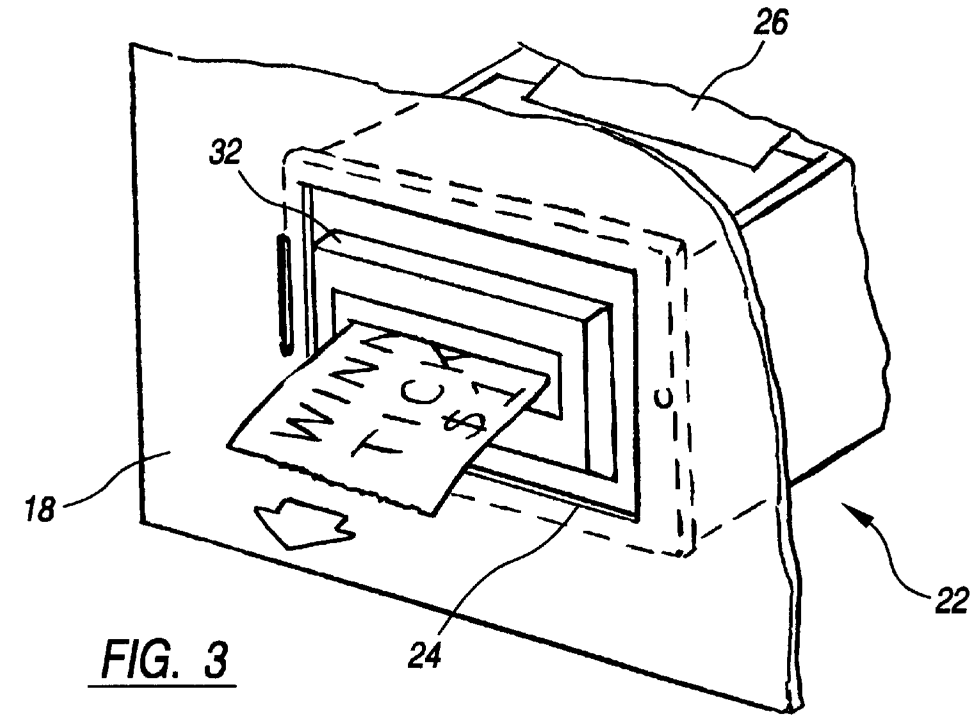
FIG. 3 is an isometric view of the barrier panel arrangement adapted for use with a ticket printer.

As best shown in FIG. 3, the opening 24 is sized to accommodate tickets dispensed from the ticket printer 26 when the ticket printer 26 is contained within the cabinet portion 22. The ticket printer 26 includes a bezel 32 through which the tickets are dispensed. The opening 24 may be sized to accommodate the bezel 32 itself. The ticket printer 26 may, for example, be a journal printer or a thermal printer and may dispense printed tickets with information relating to meters, machine configuration, machine location, date and time, software version, validation code(s), bar code(s), ticket number, monetary data such as "cashed-out" credits and corresponding cash amount, etc.

Figure 4:
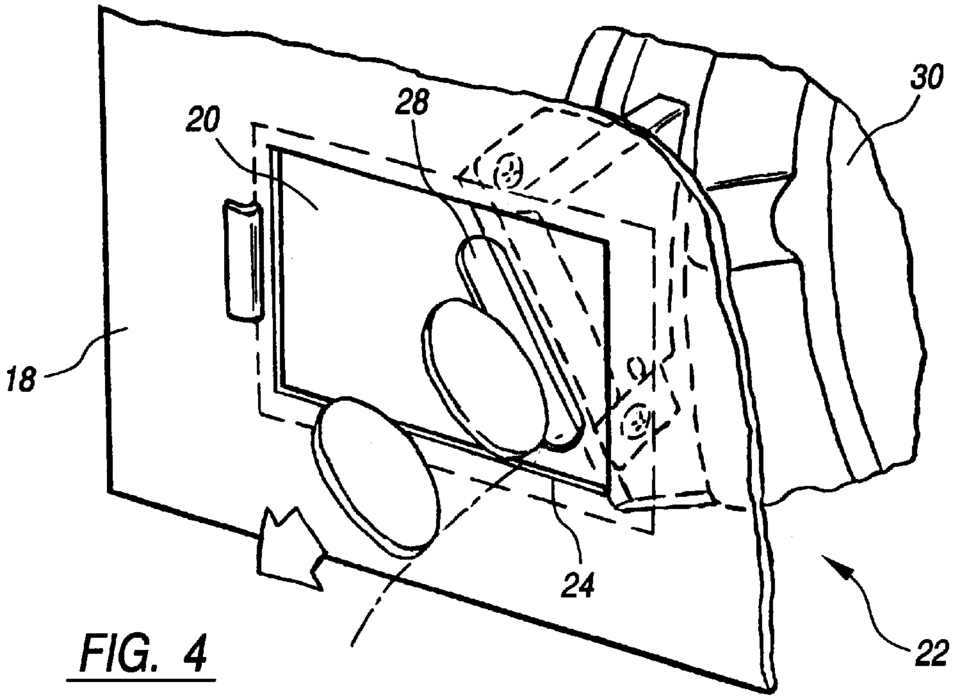
FIG. 4 is an isometric view of the barrier panel arrangement adapted for use with a coin hopper.

As best shown in FIG. 4, the cover 20 includes a slot 28 sized to accommodate coins dispensed from the coin hopper 30 when the coin hopper 30 is contained within the cabinet portion 22. The slot 28 is slanted at an angle relative to a horizontal direction and a vertical direction as determined by the hopper's output. In one embodiment, this angle is sixty degrees relative to a horizontal direction and, therefore, thirty degrees relative to a vertical direction. The size (e.g., width and length) of the slot should be larger than the largest coin or token expected to be used in the coin hopper. Additional size is required for hopper location tolerance and for various hopper manufacturers. The cover 20 is mounted to the opening 24 when the cabinet portion 22 contains the coin hopper 30 as shown in FIG. 4. The cover 20 is removed from the opening 24 when the cabinet portion 22 contains the ticket printer 26 as shown in FIG. 3.

If the cabinet portion 22 initially contains either a coin hopper 30 or a ticket printer 26, a service person may adapt the gaming machine for use with the other component as follows. First, the service person unlocks and opens the front door 14 relative to the cabinet 16. Second, the service person unlocks and opens the barrier panel 18 relative to the cabinet portion 22. Third, the service person removes the coin hopper 30 or the ticket printer 26 from the cabinet portion 22, depending upon which component is initially contained within the cabinet portion 22. Fourth, the service person installs the other component (not initially contained within the cabinet portion 22) into the cabinet portion 22. Fifth, if the service person installed a coin hopper 30 to replace a ticket printer 26, the service person mounts the cover 20 to the opening 24. If, however, the service person installed a ticket printer 26 to replace a coin hopper 30, the service person removes the cover 20 that would have been mounted to the opening 24. Sixth, the service person closes and locks the barrier panel 18 over the cabinet portion 22. Seventh, the service person closes and locks the front door 14 over the cabinet 16.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A gaming machine, comprising:

a cabinet including a cabinet portion containing one of a coin hopper and a ticket printer;

a structure including an opening proximate the one of the coin hopper and the ticket printer, the opening being sized to accommodate tickets dispensed from the ticket printer; and a detachable cover including a slot sized to accommodate coins dispensed from the coin hopper, the cover being mounted to the opening when the cabinet portion contains the coin hopper, the cover being removed from the opening when the cabinet portion contains the ticket printer.

2. The gaming machine of claim 1, wherein the structure includes a barrier panel covering the cabinet portion.

3. The gaming machine of claim 1, wherein the ticket printer includes a bezel through which the tickets are dispensed, the opening being sized to accommodate the bezel.

4. The gaming machine of claim 3, wherein the opening has a width greater than a width of the tickets.

5. The gaming machine of claim 1, wherein the slot is slanted at an angle relative to a horizontal direction and a vertical direction.

6. The gaming machine of claim 5, wherein the slot has a length greater than a diameter of the coins.

7. The gaming machine of claim 1, wherein the ticket printer is selected from a group consisting of a thermal printer and a journal printer.

8. A method for adapting a gaming machine for use with a coin hopper or a ticket printer, the gaming machine including a cabinet with a cabinet portion, the cabinet portion containing one of the coin hopper and the ticket printer, the method comprising:

providing a structure including an opening proximate the one of the coin hopper and the ticket printer, the opening being sized to accommodate tickets dispensed from the ticket printer; and adapting the structure by mounting a detachable cover to the opening when the cabinet portion contains the coin hopper and by removing the cover from the opening when the cabinet portion contains the ticket printer, the cover including a slot sized to accommodate coins dispensed from the coin hopper.

9. The method of claim 8, wherein the structure includes a barrier panel covering the cabinet portion.

10. The method of claim 8, wherein the ticket printer includes a bezel through which the tickets are dispensed, the opening being sized to accommodate the bezel.

11. The method of claim 10, wherein the opening has a width greater than a width of the tickets.

12. The method of claim 8, wherein the slot is slanted at an angle relative to a horizontal direction and a vertical direction.

13. The method of claim 12, wherein the slot has a length greater than a diameter of the coins.

14. The method of claim 8, wherein the ticket printer is selected from a group consisting of a thermal printer and a journal printer.

15. The method of claim 8, further including removing one of the coin hopper and the ticket printer from the cabinet portion and installing the other of the coin hopper and the ticket printer into the cabinet portion.

16. The method of claim 15, wherein the structure includes a barrier panel covering the cabinet portion, and further including opening the barrier panel relative to the cabinet portion prior to the step of removing the one of the coin hopper and the ticket printer from the cabinet portion, and closing the barrier panel over the cabinet portion after the step of installing the other of the coin hopper and the ticket printer into the cabinet to portion.

17. The method of claim 16, wherein the gaming machine includes a front door hinged to the cabinet and covering the barrier panel when the front door is closed, and further including opening the front door prior to the step of opening the barrier panel and closing the front door after the step of closing the barrier panel.

18. A method for adapting a hopper-based gaming machine for use with a ticket printer, the gaming machine including a cabinet with a cabinet portion, the cabinet portion initially containing a coin hopper, the method comprising:

providing a structure including an opening proximate the coin hopper;

providing a detachable cover mounted to the opening, the cover including a slot sized to accommodate coins dispensed from the coin hopper;

removing the coin hopper from the cabinet portion;

installing the ticket printer into the cabinet portion; and removing the cover from the opening, the opening being sized to accommodate tickets dispensed from the ticket printer.

19. A method for adapting a ticket-based gaming machine for use with a coin hopper, the gaming machine including a cabinet with a cabinet portion, the cabinet portion initially containing a ticket printer, the method comprising:

providing a structure including an opening proximate the coin hopper, the opening being sized to accommodate tickets dispensed from the ticket printer;

removing the ticket printer from the cabinet portion;

installing the coin hopper into the cabinet portion; and mounting a detachable cover to the opening, the cover including a slot sized to accommodate coins dispensed from the coin hopper.

20. A method for adapting a gaming machine for use with a coin hopper or a ticket printer, the gaming machine including a cabinet with a cabinet portion, the cabinet portion initially containing one of the coin hopper and the ticket printer, the method comprising:

providing a structure including an opening proximate the one of the coin hopper and the ticket printer;

removing the one of the coin hopper and the ticket printer from the cabinet portion;

installing the other of the coin hopper and the ticket printer into the cabinet portion; and mounting a detachable cover to the opening if the other of the coin hopper and the ticket printer is the coin hopper, the cover including a slot sized to accommodate coins dispensed from the coin hopper; and removing the cover from the opening if the other of the coin hopper and the ticket printer is the ticket printer, the opening being sized to accommodate tickets dispensed from the ticket printer.

21. The method of claim 20, wherein the structure includes a barrier panel covering the cabinet portion, and further including opening the barrier panel relative to the cabinet portion prior to the step of removing the one of the coin hopper and the ticket printer from the cabinet portion, and closing the barrier panel over the cabinet portion after the step of installing the other of the coin hopper and the ticket printer into the cabinet portion.

* * * * *